Figure 1:
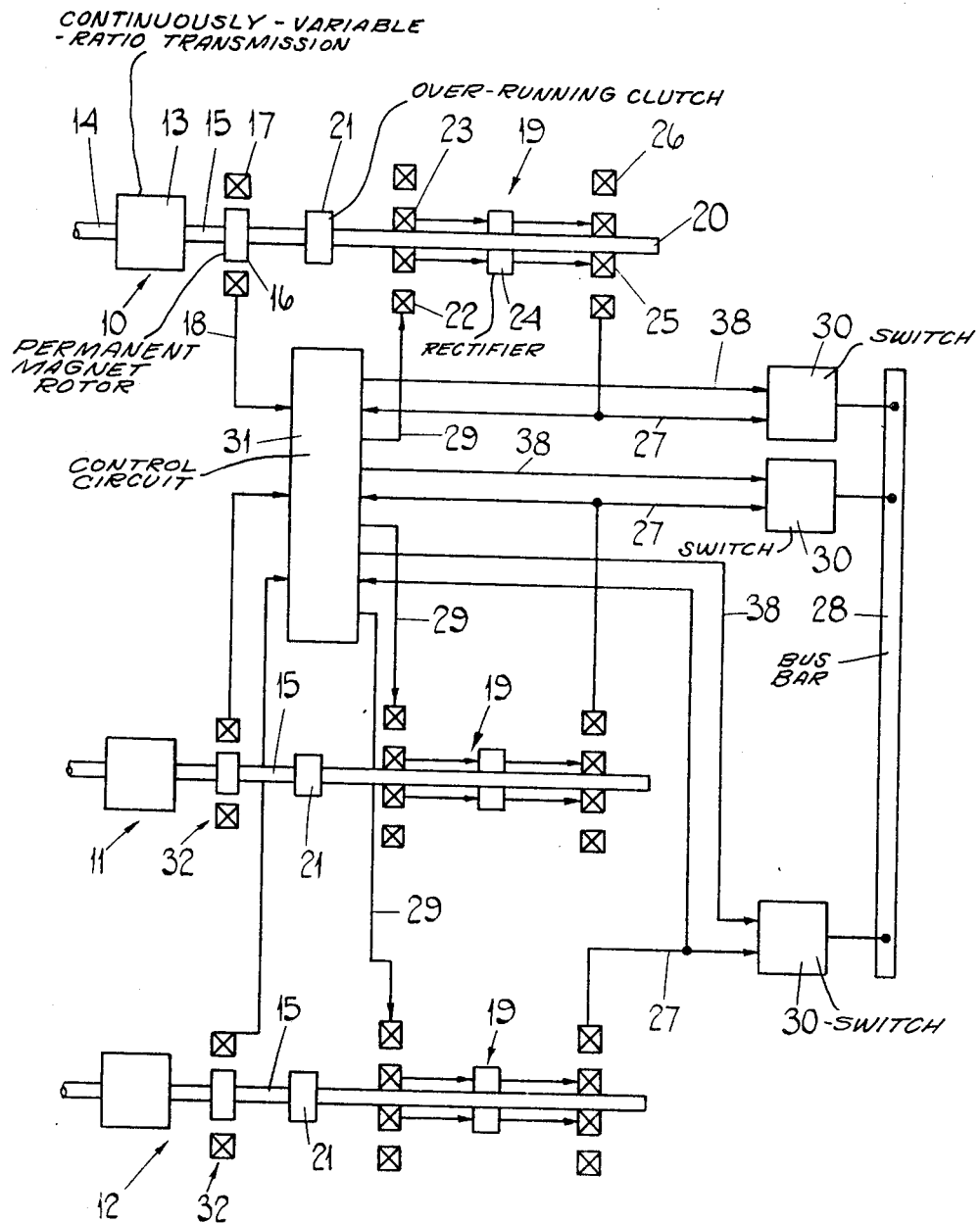

United States Patent [19]

Sharpe et al.

[11] 4,074,180
[45] Feb. 14, 1978

[54] ELECTRIC CURRENT GENERATOR ARRANGEMENTS

[75] Inventors: Raymond Sharpe, Mirfield; Kenneth Darnbrough, Bingley, both of England

[73] Assignee: Lucas Industries Limited, Great Britain

[21] Appl. No.: 659,169

[22] Filed: Feb. 18, 1976

[30] Foreign Application Priority Data

Feb. 25, 1975 United Kingdom ................. 7754/75

[51] Int. Cl.² .......................... H02H 7/06; H02P 9/00; H02J 1/00
[52] U.S. Cl. ....................................... 322/29; 307/84; 307/87; 322/32; 361/20
[58] Field of Search ..................... 322/14–16, 322/29, 32, 39–42, 27; 307/57, 87, 84, 85; 317/13 R, 19, 20; 361/20, 21

[56] References Cited

U.S. PATENT DOCUMENTS

| | | | |
|---|---|---|---|
| 2,829,278 | 4/1958 | Flugstad | 307/87 X |
| 2,883,611 | 4/1959 | Fuge | 322/32 X |
| 3,378,756 | 4/1968 | Potter | 222/32 |
| 3,504,271 | 3/1970 | Sanabria et al. | 222/61 |
| 3,673,422 | 6/1972 | Parke | 307/87 |
| 3,758,843 | 9/1973 | Ishizaki et al. | 322/27 X |

FOREIGN PATENT DOCUMENTS

| | | |
|---|---|---|
| 2,358,676 | 11/1973 | Germany. |
| 1,329,281 | 9/1973 | United Kingdom. |
| 1,329,282 | 9/1973 | United Kingdom. |
| 1,329,283 | 9/1973 | United Kingdom. |

*Primary Examiner*—Robert J. Hickey
*Attorney, Agent, or Firm*—Kane, Dalsimer, Kane, Sullivan and Kurucz

[57] ABSTRACT

An electrical generator arrangement includes a variable-ratio drive device, an alternator driven by the drive device and a generator which is separately excited by the alternator output. An over-running clutch connects the alternator and generator rotors so that in the event of an alteration in the driving output from the drive device the generator can continue to rotate with its normal speed and direction but the frequency of the alternator output provides an indication of the operating state of the drive device.

8 Claims, 2 Drawing Figures

ELECTRIC CURRENT GENERATOR ARRANGEMENTS

This invention relates to electric current generator arrangements.

It is known to provide electrical generator systems which include a plurality of separately-excited generators which are driven by constant-speed drive units, and to connect the outputs of the generators in parallel to a common supply terminal. It is also known to arrange that the driving connection between each constant-speed drive unit and its associated generator is such that in one direction of rotation, the speeds of the unit and generator may differ, for example by the provision of an over-running clutch.

In such arrangements, in the event of failure of one of the constant-speed drive units, the generator associated with that unit may continue to rotate in synchronism with the other generator, or generators, in the system, so that the speed of a generator will not necessarily provide an indication of the correct functioning of the associated drive unit.

According to the invention an electric current generator arrangement comprises a continuously-variable-ratio transmission device having input and output shafts, an electric alternator having a rotor drivingly connected to said output shaft, an electrical generator having a first winding excitable by a voltage derived from the alternating current from said alternator and a second winding from which an output current of said generator can be derived, means for drivingly connecting said output shaft and the rotor of said generator so that the ratio of the speed of said output shaft to the speed of said rotor may vary, whereby the frequency of said alternating current provides an indication of the speed of the output shaft of said transmission device.

Figure 2:
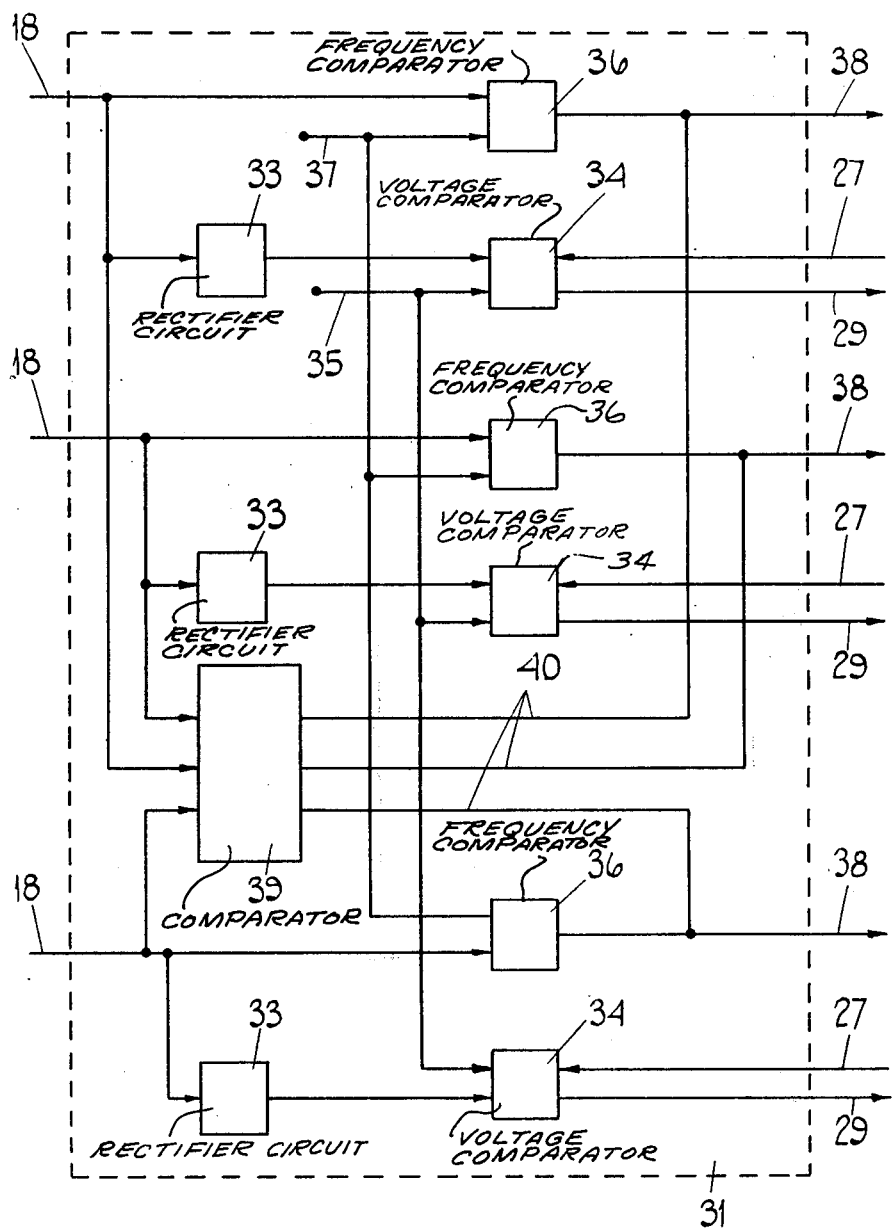

An example of the invention will now be described with reference to the accompanying drawings in which:

FIG. 1 shows, diagrammatically, a plurality of electric current generator arrangements, and FIG. 2 is a block diagram of a control circuit in FIG. 1.

As shown in FIG. 1 there are three interconnected electric current generator arrangements 10, 11, 12. Arrangement 10 has a continuously variable-ratio transmission device 13 having an input shaft 14 and an output shaft 15. Device 13 is substantially the same as a corresponding device shown and described in British Patent Specification No. 1,358,845.

Secured to output shaft 15 is a permanent magnet rotor 16 mounted between stator windings 17, whereby rotation of output shaft 15 induces an alternating current in a line 18, the frequency of this current being dependent on the speed of output shaft 15.

A brushless electrical generator 19 has its rotor 20 drivingly connected to output shaft 15 by means of an over-running clutch 21, so that should device 13 not continue to provide a drive on output shaft 15, generator 19 can continue to rotate in its normally-driven direction.

Generator 19 includes a first stator winding 22 which is, in use, excited by d.c. power which is supplied on a line 29 and is derived from the alternating current on line 18 by means of a control circuit 31, later to be described. Rotor 20 of generator 19 includes first rotor windings 23 which are responsive to rotation of rotor 20 and excitation of stator winding 22 to provide an alternating output to a rectifier arrangement 24 forming part of the rotor 20.

The d.c. output of rectifier arrangement 24 is applied to second rotor windings 25 which rotate within second stator windings 26, whereby in use stator windings 26 cause an alternating current to be supplied on a line 27. Line 27 is connected to a bus-bar 28 via a switch 30.

Electric current generator arrangements 11 and 12 are substantially identical with the arrangement 10, current from the alternators 32 on the output shafts 15 being supplied to the first stator windings 22 of the corresponding brushless electrical generators 19 via the control circuit 31. Alternating current output from the generators 19 of the respective arrangements 11, 12 is supplied to the bus-bar 28 via respective switches 30.

As shown in FIG. 2 control circuit 31 includes three rectifier circuits 33 responsive to alternating current on respective ones of the lines 18 to provide a d.c. output on respect ones of lines 29. The d.c. levels on line 29 are controlled by respective comparator circuits 34 which are responsive to the voltage levels on corresponding ones of the lines 27 and also to a reference voltage on a line 35.

The alternating currents on the lines 18 are also supplied to respective frequency comparators 36, the comparators 36 also being responsive to a reference frequency on a line 37. At predetermined differences between the frequencies on the lines 18 and on the line 37 the comparators 36 provide control signals on respective lines 38 to cause corresponding switches 30 to isolate their associated generators 19 from the bus-bar 28.

Circuit 31 also includes a further comparator 39 responsive to the frequencies of the alternating currents in each of the lines 18. Comparator 39 provides a control signal on one of a group of lines 40 when the frequency of the signal on one of the lines 18 differs from the frequency of the signal on the other two lines 18 by more than a predetermined amount. The switches 30 are responsive to the control signals on respective ones of lines 40, so that signals thereon isolate the generators 19 from the bus-bar 28. The control circuit 31 thus provides that if the speed of the shaft 15 on any one of the generator arrangements 10, 11 or 12 differs by more than a predetermined amount from the speeds of the shafts 15 in the other two arrangements, or differs by more than a predetermined amount from a predetermined value, the supply from that generator arrangement is shut off.

We claim:

1. An electric current generator arrangement comprising a continuously-variable-ratio transmission device having input and output shafts, an electric alternator having a rotor drivingly connected to said output shaft, an electrical generator having a first winding excitable by a voltage derived from the alternating output from said alternator and a second winding from which an output current of said generator can be derived, and an over-running clutch connecting said output shaft and the rotor of said generator so that the speed of said output shaft may be less than that of said rotor, and means responsive to the frequency of an electrical output from said alternator for providing an indication of the speed of the output shaft of said transmission.

2. An electric current generator arrangement comprising a continuously-variable-ratio transmission device having input and output shafts, an electric alternator having a rotor drivingly connected to said output shaft, an electrical generator having a first winding excitable by a voltage derived from the alternating output from said alternator and a second winding from which an output current of said generator can be derived, and an over-running clutch for connecting said output shaft and the rotor of said generator so that the speed of said output shaft may be less than that of said rotor, and means responsive to the frequency of said alternating output and to a further frequency, for providing a control signal when said frequencies differ by more than a predetermined amount.

3. An arrangement as claimed in claim 2 which includes switching means responsive to said control signal for controlling the delivery of current from said generator.

4. An arrangement as claimed in claim 2 which includes a first comparator circuit, responsive to a voltage derived from said alternating output and to a further voltage, for controlling the voltage supplied to said first winding of said generator.

5. An arrangement as claimed in claim 4 in which said further voltage is derived from the output of said alternator.

6. An arrangement as claimed in claim 4 in which said further voltage is a predeterminable reference voltage.

7. An arrangement as claimed in claim 4 which includes a plurality of said continuously-variable-ratio transmission devices, a plurality of said alternators having rotors drivingly connected to the output shafts of respective ones of said transmission devices, a plurality of said generators whose first windings are excitable by respective ones of said alternators, a plurality of said means for drivingly connecting respective ones of said output shafts to said generator rotors, and a second comparator circuit responsive to the frequencies of the alternating output from said alternators, said second comparator having a plurality of output connections respectively corresponding to said alternators and being responsive to a difference of greater than a predetermined amount between one of said frequencies and the others of said frequencies, to provide a control signal at the output connection corresponding to the alternator having an output of said one frequency.

8. An arrangement as claimed in claim 7 which includes a plurality of switch means, responsive to the control signals on respective ones of said output connections, for isolating the output of a generator associated with an alternator whose alternating output is at said one frequency.

* * * * *